(12) United States Patent
Shi

(10) Patent No.: US 9,567,496 B2
(45) Date of Patent: Feb. 14, 2017

(54) SILVER CONDUCTIVE ADHESIVE AND PREPARATION METHOD

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Bo Shi, Beijing (CN)

(73) Assignees: BOE TECHNOLOGY GROUP CO., LTD., Beijing (CN); CHENGDU BOE OPTOELECTRONICS TECHNOLOGY CO., LTD., Beijing (CN)

( * ) Notice: Subject to any disclaimer, the term of this patent is extended or adjusted under 35 U.S.C. 154(b) by 242 days.

(21) Appl. No.: 14/379,457

(22) PCT Filed: Nov. 6, 2013

(86) PCT No.: PCT/CN2013/086588
§ 371 (c)(1),
(2) Date: Aug. 18, 2014

(87) PCT Pub. No.: WO2015/018138
PCT Pub. Date: Feb. 12, 2015

(65) Prior Publication Data
US 2016/0237322 A1 Aug. 18, 2016

(30) Foreign Application Priority Data
Aug. 8, 2013 (CN) .......................... 2013 1 0343968

(51) Int. Cl.
*C09J 9/02* (2006.01)
*C09J 163/00* (2006.01)
(Continued)

(52) U.S. Cl.
CPC . *C09J 9/02* (2013.01); *C09J 11/04* (2013.01); *C09J 163/00* (2013.01); *C09J 163/04* (2013.01);
(Continued)

(58) Field of Classification Search
CPC ............. C09J 9/02; C09J 183/04; C09J 11/04; C09J 163/00; C09J 163/04; C08K 2003/0806
(Continued)

(56) References Cited

U.S. PATENT DOCUMENTS

2005/0279970 A1* 12/2005 Ogi ....................... B22F 1/0011
252/514

FOREIGN PATENT DOCUMENTS

| CN | 1709619 A | 12/2005 |
|----|-----------|---------|
| CN | 101805575 A | 8/2010 |

(Continued)

OTHER PUBLICATIONS

First Chinese Office Action Appln. No. 201310343968.X; Dated Feb. 4, 2015.
(Continued)

*Primary Examiner* — Mark Kopec
*Assistant Examiner* — Danny N Kang
(74) *Attorney, Agent, or Firm* — Ladas & Parry LLP

(57) ABSTRACT

A silver conductive adhesive comprising silver powders is disclosed. The silver powders are spherical silver powders. A method for preparing the silver conductive adhesive is further disclosed. The silver conductive adhesive has higher heating and curing efficiency, obviously shortening the curing time period and improving yield.

14 Claims, 3 Drawing Sheets

(51) Int. Cl.
*C09J 163/04* (2006.01)
*C09J 11/04* (2006.01)
*C09J 11/00* (2006.01)
*C08K 7/18* (2006.01)
*C08K 3/08* (2006.01)

(52) U.S. Cl.
CPC ......... *C08K 7/18* (2013.01); *C08K 2003/0806* (2013.01)

(58) Field of Classification Search
USPC ....................................................... 252/500
See application file for complete search history.

(56) References Cited

FOREIGN PATENT DOCUMENTS

| | | | |
|---|---|---|---|
| CN | 101851478 A | | 10/2010 |
| CN | 102013281 A | * | 4/2011 |
| CN | 102766426 A | * | 11/2012 |
| CN | 103074030 A | | 5/2013 |
| JP | 2001-002892 A | | 1/2001 |
| JP | 2004-277572 A | | 10/2004 |

OTHER PUBLICATIONS

International Preliminary Report on Patentability issued Feb. 9, 2016; PCT/CN2013/086588.
International Search Report Appln. No. PCT/CN2013/086588; Dated May 5, 2014.

* cited by examiner

SILVER CONDUCTIVE ADHESIVE AND PREPARATION METHOD

TECHNICAL FIELD

Embodiments of the present invention relate to a silver conductive adhesive and a preparation method thereof.

BACKGROUND

In order to conduct static electricity, in-plane switching (IPS) and fringe field switching (FFS) liquid crystal display (LCD) products require the dispensing of a silver adhesive on a rear conductive layer (indium tin oxide (ITO)) of a color filter (CF) substrate and a ground resistance area of an array substrate. The traditional silver conductive epoxy adhesive is usually prepared by using flake or dendritic silver powders in connection with a certain proportion of epoxy resin, curing agent, dispersant and the like. The silver conductive adhesive has a high curing temperature and a long curing time period, usually heating for 2 hours at the temperature of 70 centigrades, hence affecting the productivity of chip on glass (COG). In order to accelerate the velocity of turnover, more ovens have to be arranged in the production line. Therefore, not only the equipment investment is increased but also the space of the production line is limited. Meanwhile, trays tend to be deformed due to long-term high-temperature heating, resulting in loss of materials.

In the heating process of the traditional silver conductive adhesive, surface curing occurs at first; the surface-cured silver adhesive forms one layer of "casing" 1-1, so that the organic dispersant in the internal non-cured silver adhesive 1-2 cannot be easily volatilized; and meanwhile, external heat cannot be easily transmitted to the internal silver adhesive, so that the curing time becomes longer, as illustrated in FIG. 1. Moreover, due to poor fluidity of flake or dendritic silver powders, more organic solvent or dispersant is needed to guarantee appropriate viscosity. After the silver adhesive is cured, the volume of the silver adhesive is reduced (partially reduced in the thickness direction) due to the volatilization of both the organic solvent and the dispersant. The longitudinal shrinkage of the silver adhesive is currently 35 to 46 percent, and hence the silver conductive adhesive 1 at a connection between a CF substrate 2 and an array substrate 3 tends to be overly thin and even gives to disconnected so that the electric conductivity is lost, as illustrated in FIGS. 2A and 2B.

SUMMARY

The embodiments of the present invention provide a silver conductive adhesive with short curing time period and low shrinkage.

The embodiments of the present invention further provide a method for preparing the silver conductive adhesive.

The silver conductive adhesive provided by an embodiment of the present invention comprises silver powders, wherein the silver powders are spherical silver powders.

For instance, the particle diameter of the spherical silver powders is from 1 to 10 micrometers.

For instance, the silver conductive adhesive may comprise 50 to 60 percent of spherical silver powders by weight.

For instance, the silver conductive adhesive may further comprise 3 to 10 percent of promoter and 0.5 to 3 percent of catalyst by weight; the promoter is moisture-curable polyurethane; and the catalyst is polyglycol ether.

For instance, the silver conductive adhesive may further comprise 10 to 15 percent of epoxy resin, 15 to 25 percent of dispersant and 1 to 5 percent of curing agent.

For instance, the epoxy resin may be one or more selected from the group consisting of bisphenol-A epoxy resin, aliphatic epoxy resin and novolac epoxy resin.

For instance, the dispersant may be one or more selected from the group consisting of ethanol, isopropanol, acetone, cyclohexanone, ethylene glycol diethyl ether, and ethylene glycol monobutyl ether acetate.

For instance, the curing agent may be one or more selected from the group consisting of dicyandiamide, imidazole, and adipic dihydrazide.

The method for preparing the silver conductive adhesive provided by an embodiment of the present invention, comprises: mixing and stirring the spherical silver powders, the epoxy resin, the dispersant, the curing agent, the promoter and the catalyst until they are uniformly dispersed.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

Figure 1:
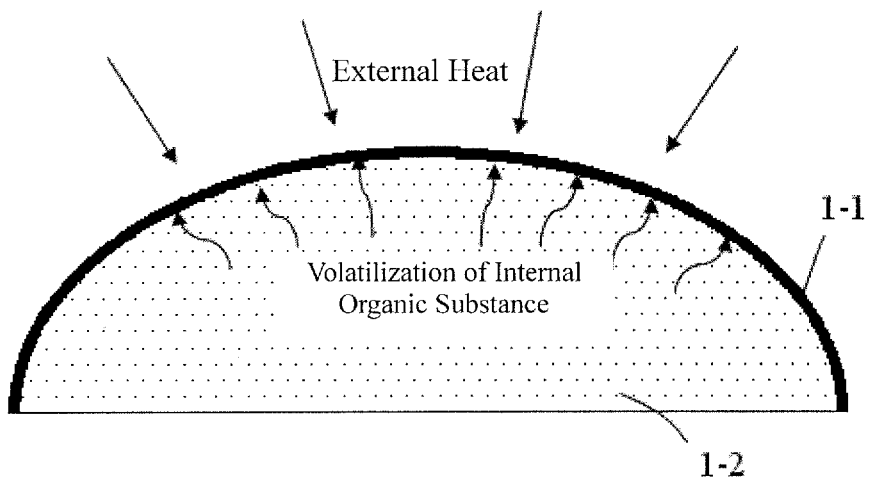
FIG. 1 is a schematic diagram illustrating the heating and curing state of a silver conductive adhesive.

REFERENCE NUMERALS 1. silver conductive adhesive;
1-1. surface-cured silver adhesive;
1-2. internal non-cured silver adhesive;
2. CF substrate;
3. array substrate;
4. spherical silver powders;
5. material in silver adhesive other than silver powders (epoxy resin, promoter and the like).

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

The embodiment of the present invention provides a silver conductive adhesive, which comprises silver powders. The silver powders are spherical silver powders.

Figure 2A:
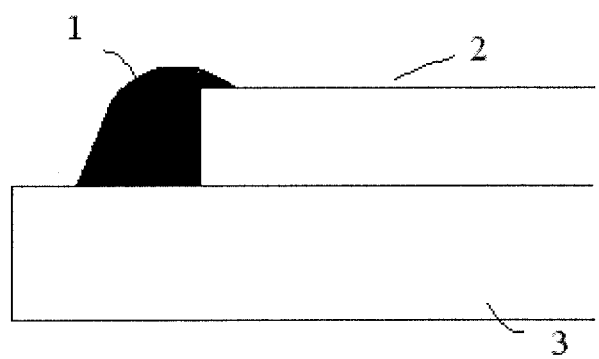
FIGS. 2A and 2B are respectively schematic diagrams illustrating the shrinkage of the silver conductive adhesive between substrates before and after curing.
Figure 2B:
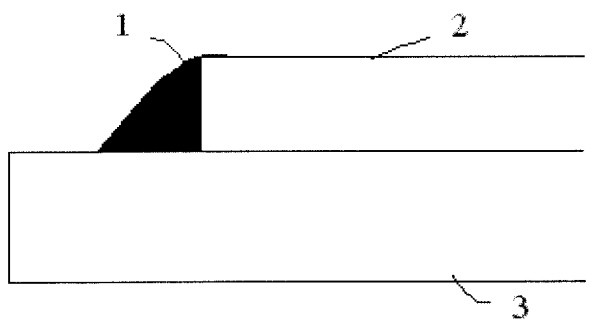
Figure 3A:
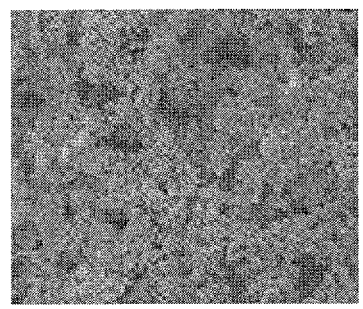
FIG. 3A is a scanning electron microscope (SEM) picture of flake silver powders.
Figure 3B:
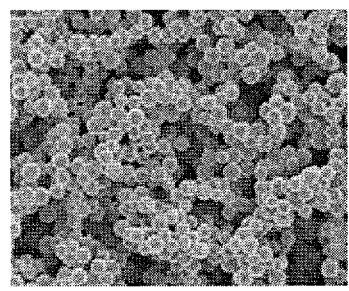
FIG. 3B is a SEM picture of spherical silver powders.
Figure 4:
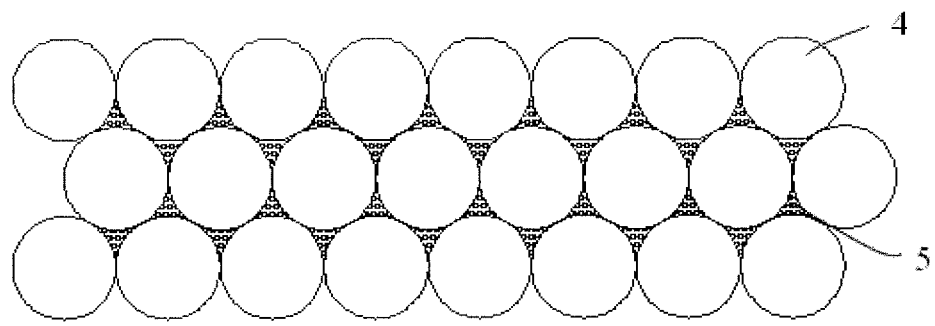
FIG. 4 is a schematic diagram illustrating the state of the silver conductive adhesive provided by the present invention after curing.

The spherical silver powders and common flake silver powders have large difference in microstructure (as illustrated in FIGS. 3A and 3B). The microscopic stacking structure of the spherical silver powders presents three-dimensional (3D) connection type. For instance, as illustrated in FIG. 4, spherical silver powders 4 are regularly stacked via colloid part 5; and adjacent spherical silver powders 4 are connected with each other, and hence the electrical conduction can be achieved. The colloid part 5 is the material in the silver adhesive excluding the silver powders after curing (epoxy resin, promoter, and the like). The structure is helpful for better volatilization of organic substances in the curing process of the silver adhesive, and hence accelerates the curing rate of the silver adhesive and improves the curing efficiency. Meanwhile, the spherical silver powders also have good fluidity, and hence reduce the usage amount of the dispersant and the like in the silver adhesive and effectively reduce the volume shrinkage in the curing process of the silver adhesive. With the silver conductive adhesive, the quality of IPS type and FFS type LCD products and the like can be improved, for instance, the problems as illustrated in FIGS. 2A and 2B can be avoided when the array substrate and the CF substrate are connected.

Preferably, for instance, the particle diameter of the spherical silver powders is from 1 to 10 micrometers. For instance, the silver conductive adhesive comprises 50 to 60 percent of spherical silver powders by weight.

Preferably, for instance, the silver conductive adhesive further comprises 3 to 10 percent of promoter and 0.5 to 3 percent of catalyst by weight. For instance, the promoter is moisture-curable polyurethane, and the catalyst is polyglycol ether. Under the catalysis action of the catalyst, the promoter can react with moisture in the air and emit heat, and hence can heat the silver adhesive from the "inside"; and with cooperation of "external" (oven) heating, the heating efficiency can be maximized accordingly, significantly shortening the heating time and reducing the heating temperature.

The silver conductive adhesive provided by the embodiment of the present invention may further comprise 10 to 15 percent of an epoxy resin, 15 to 25 percent of a dispersant, and 1 to 5 percent of a curing agent.

In the silver conductive adhesive provided by the embodiment of the present invention, the epoxy resin may be any appropriate epoxy resin, for instance, any epoxy resin applied in the traditional silver conductive adhesive. Preferably, the epoxy resin includes but not limited to one or more selected from the group consisting of bisphenol-A epoxy resin, aliphatic epoxy resin, and novolac epoxy resin.

In the silver conductive adhesive provided by the embodiment of the present invention, the dispersant may be any appropriate dispersant, for instance, any dispersant applied in the traditional silver conductive adhesive. Preferably, the dispersant includes but not limited to one or more selected from the group consisting of ethanol, isopropanol, acetone, cyclohexanone, ethylene glycol diethyl ether, and ethylene glycol monobutyl ether acetate.

In the silver conductive adhesive provided by the embodiment of the present invention, the curing agent may be any appropriate curing agent, for instance, any curing agent applied in the traditional silver conductive adhesive. Preferably, the curing agent includes but not limited to one or more selected from the group consisting of dicyandiamide, imidazole, and adipic dihydrazide.

The method for preparing the silver conductive adhesive, provided by the embodiment of the present invention, can be conducted as follows: the spherical silver powders, the epoxy resin, the dispersant, the curing agent, the promoter and the catalyst are mixed and stirred until they are uniformly dispersed.

In the preparation method, the feeding sequence of the components in the silver conductive adhesive is not particularly limited. The process conditions or process equipments of the preparation method may select the traditional process conditions or equipments for preparing the silver conductive adhesive, for instance, a high-speed dispersion machine may be selected for mixing and dispersing, or simple change can be conducted by those skilled in the art.

The following embodiments are only for illustration and not intended to limit the scope of the present invention. If not specified, the agents used in the embodiments are all conventional commercially available agents, and the technical means used in the embodiments are all conventional means well-known by those skilled in the art.

Illustratively, in the embodiment, the particle diameter of the spherical silver powders is from 1 to 10 micrometers; the bisphenol-A epoxy resin is epoxy resin 618 (E-51); the moisture-curable polyurethane is KS991; the polyglycol ether is polyether F-68; and the aliphatic epoxy resin is JEw-0110.

Embodiment 1

Components (part by weight): 52 parts of spherical silver powders, 15 parts of bisphenol-A epoxy resin, 18 parts of cyclohexanone, 4 parts of dicyandiamide, 1 part of imidazole, 9 parts of moisture-curable polyurethane, and 1 part of polyglycol ether.

Preparation process: the components are subjected to stirring and defoaming after mixing until the components are uniformly dispersed to obtain a finished product silver conductive adhesive.

Figure 5:
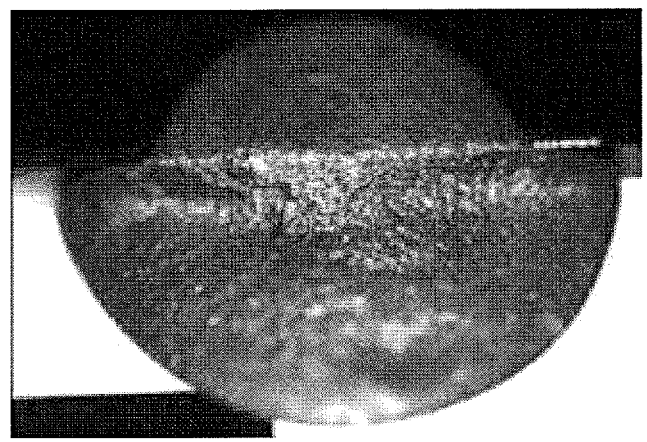
FIG. 5 is a top view (under microscope) illustrating the state of the silver conductive adhesive provided by the embodiment 1 after being coated to substrates and cured.

The curing temperature of the silver conductive adhesive is about 70 centigrade; the curing time is about 15 minutes; the longitudinal shrinkage after curing is about 15 percent; the transverse shrinkage is less than 5 percent; and the electrical resistivity is less than $1.2 \times 10^{-4}$ $\Omega \cdot cm$. FIG. 5 illustrates the appearance of the silver conductive adhesive after curing.

Embodiment 2

Components (part by weight): 50 parts of spherical silver powders, 10 parts of bisphenol-A epoxy resin, 4 parts of aliphatic epoxy resin, 21 parts of isopropanol, 4 parts of adipic dihydrazide, 9 parts of moisture-curable polyurethane, and 2 parts of polyglycol ether.

The preparation process is the same as that of the embodiment 1.

The curing temperature of the silver conductive adhesive is about 70 centigrade; the curing time is about 16 minutes; the longitudinal shrinkage after curing is about 17 percent; the transverse shrinkage is less than 5 percent; and the electrical resistivity is less than $1.2 \times 10^{-4}$ $\Omega \cdot cm$.

Embodiment 3

Components (part by weight): 56 parts of spherical silver powders, 10 parts of bisphenol-A epoxy resin, 2 parts of aliphatic epoxy resin, 16 parts of acetone, 2 parts of adipic dihydrazide, 2 parts of dicyandiamide, 1 part of imidazole, 9.5 parts of moisture-curable polyurethane and 1.5 parts of polyglycol ether.

The preparation process is the same as that of the embodiment 1.

The curing temperature of the silver conductive adhesive is about 70 centigrade; the curing time is about 14 minutes; the longitudinal shrinkage after curing is about 14 percent; the transverse shrinkage is less than 5 percent; and the electrical resistivity is less than $1.2 \times 10^{-4}$ Ω·cm.

Embodiment 4

Components (part by weight): 60 parts of spherical silver powders, 10 parts of bisphenol-A epoxy resin, 15 parts of cyclohexanone, 2 parts of dicyandiamide, 1 part of imidazole, 10 parts of moisture-curable polyurethane, and 2 parts of polyglycol ether.

The preparation process is the same as that of the embodiment 1.

The curing temperature of the silver conductive adhesive is about 70 centigrade; the curing time is about 13 minutes; the longitudinal shrinkage after curing is about 12 percent; the transverse shrinkage is less than 5 percent; and the electrical resistivity is less than $1.2 \times 10^{-4}$ Ω·cm.

Comparative Example 1

The silver conductive adhesive is prepared by the process the same as that in the embodiment 1, except that spherical silver powders are replaced by flake silver powders (in order to ensure the fluidity of the silver powders, the usage amount of dispersant is doubled).

The curing temperature of the silver conductive adhesive is about 70 centigrade; the curing time is about 120 minutes; the longitudinal shrinkage after curing is about 41 percent; the transverse shrinkage is about 5 percent; and the electrical resistivity is less than $1.2 \times 10^{-4}$ Ω·cm.

Comparative Example 2

The silver conductive adhesive is prepared by the process the same as that in the embodiment 1, except that promoter and catalyst are not added.

The curing temperature of the silver conductive adhesive is about 70 centigrade; the curing time is about 60 minutes; the longitudinal shrinkage after curing is about 15 percent; the transverse shrinkage is about 5 percent; and the electrical resistivity is less than $1.2 \times 10^{-4}$ Ω·cm.

The embodiment of the present invention provides a silver conductive adhesive employing spherical silver powders as the main raw material. The microscopic stacking structure of the silver conductive adhesive possesses 3D connection type. The silver conductive adhesive has good fluidity, high heating efficiency, and low shrinkage after curing. The prepared IPS type and FFS type LCD products have high quality. Moreover, the promoter and the catalyst may be further added into the silver conductive adhesive provided by the embodiments of the present invention, so that the heating ways can be changed, and hence the silver adhesive has higher and more uniform heating and curing efficiency, obviously shortening the curing time period and improving yield. The method for preparing the silver conductive adhesive, provided by the embodiments of the present invention, has simple process and is suitable for industrial applications.

The foregoing is only the preferred embodiments of the present invention and not intended to limit the scope of protection of the present invention. The scope of protection of the present invention should be defined by the appended claims.

The invention claimed is:

1. A silver conductive adhesive, comprising silver powders, wherein the sliver powders are spherical silver powders;
   the silver conductive adhesive further comprises 3 to 10 percent of promoter and 0.5 to 3 percent of catalyst by weight;
   the promoter is moisture-curable polyurethane; and
   the catalyst is polyglycol ether.

2. The silver conductive adhesive according to claim 1, wherein the silver conductive adhesive further comprises 10 to 15 percent of epoxy resin, 15 to 25 percent of dispersant and 1 to 5 percent of curing agent by weight.

3. The silver conductive adhesive according to claim 2, wherein the epoxy resin is one or more selected from the group consisting of bisphenol-A epoxy resin, aliphatic epoxy resin and novolac epoxy resin.

4. The silver conductive adhesive according to claim 2, wherein the dispersant is one or more selected from the group consisting of ethanol, isopropanol, acetone, cyclohexanone, ethylene glycol diethyl ether, and ethylene glycol monobutyl ether acetate.

5. The silver conductive adhesive according to claim 2, wherein the curing agent is one or more selected from the group consisting of dicyandiamide, imidazole and adipic dihydrazide.

6. The silver conductive adhesive according to claim 2, wherein the spherical silver powders, the epoxy resin, the dispersant, the curing agent, the promoter and the catalyst are mixed and stirred until being uniformly dispersed.

7. The silver conductive adhesive according to claim 1, wherein the silver conductive adhesive comprises 50 to 60 percent of spherical silver powders by weight.

8. The silver conductive adhesive according to claim 7, wherein the silver conductive adhesive further comprises 10 to 15 percent of epoxy resin, 15 to 25 percent of dispersant and 1 to 5 percent of curing agent by weight.

9. The silver conductive adhesive according to claim 8, wherein the epoxy resin is one or more selected from the group consisting of bisphenol-A epoxy resin, aliphatic epoxy resin and novolac epoxy resin.

10. The silver conductive adhesive according to claim 8, wherein the dispersant is one or more selected from the group consisting of ethanol, isopropanol, acetone, cyclohexanone, ethylene glycol diethyl ether, and ethylene glycol monobutyl ether acetate.

11. The silver conductive adhesive according to claim 8, wherein the curing agent is one or more selected from the group consisting of dicyandiamide, imidazole and adipic dihydrazide.

12. The silver conductive adhesive according to claim 8, wherein the spherical silver powders, the epoxy resin, the dispersant, the curing agent, the promoter and the catalyst are mixed and stirred until being uniformly dispersed.

13. The silver conductive adhesive according to claim 1, wherein the particle diameter of the spherical silver powders is from 1 to 10 micrometers.

14. The silver conductive adhesive according to claim 3, wherein the dispersant is one or more selected from the group consisting of ethanol, isopropanol, acetone, cyclohexanone, ethylene glycol diethyl ether, and ethylene glycol monobutyl ether acetate.

\* \* \* \* \*